(12) United States Patent
Casutt et al.

(10) Patent No.: US 12,104,884 B2
(45) Date of Patent: Oct. 1, 2024

(54) BALLISTIC GLASS AND ASSOCIATED METHODS AND ASSEMBLIES

(71) Applicant: Armitek LLC, Orem, UT (US)

(72) Inventors: Dean Casutt, Spanish Fork, UT (US); Bryant Casutt, Spanish Fork, UT (US)

(73) Assignee: Arimtek LLC, Orem, UT (US)

( * ) Notice: Subject to any disclaimer, the term of this patent is extended or adjusted under 35 U.S.C. 154(b) by 194 days.

(21) Appl. No.: 17/553,377

(22) Filed: Dec. 16, 2021

(65) Prior Publication Data
US 2022/0196369 A1 Jun. 23, 2022

Related U.S. Application Data

(60) Provisional application No. 63/127,858, filed on Dec. 18, 2020.

(51) Int. Cl.
| | | |
|---|---|---|
| *F41H 5/04* | (2006.01) | |
| *B32B 7/12* | (2006.01) | |
| *B32B 17/10* | (2006.01) | |
| *B32B 27/36* | (2006.01) | |

(52) U.S. Cl.
CPC .............. *F41H 5/0407* (2013.01); *B32B 7/12* (2013.01); *B32B 17/10073* (2013.01); *B32B 17/10752* (2013.01); *B32B 27/365* (2013.01); *B32B 2250/04* (2013.01); *B32B 2307/412* (2013.01); *B32B 2307/54* (2013.01); *B32B 2307/558* (2013.01); *B32B 2307/732* (2013.01); *B32B 2571/02* (2013.01)

(58) Field of Classification Search
None
See application file for complete search history.

(56) References Cited

U.S. PATENT DOCUMENTS

2011/0177310 A1* 7/2011 Ryan ....................... B32B 27/36
428/339
2019/0263227 A1* 8/2019 Noda ................ B32B 17/10752

FOREIGN PATENT DOCUMENTS

CN 2517740 Y * 10/2002

OTHER PUBLICATIONS

"Ceramics are by definition natural or synthetic inorganic, non-metallic, polycrystalline materials." See "Structure and properties of ceramics" downloaded from https://ceramics.org/about/what-are-engineered-ceramics-and-glass/structure-and-properties-of-ceramics/ and by the American Ceramic Society, Aug. 28, 2020.*
Ballistic Armor Glossary, downloaded from https://www.ade.pt/ballistic-armor-glossary, no date.*

* cited by examiner

*Primary Examiner* — David Sample
(74) *Attorney, Agent, or Firm* — TraskBritt

(57) ABSTRACT

A ballistic glass assembly may include a first layer of a poly ethylene terephthalate (PET) adhesive film. The ballistic glass assembly may further include a second layer of glass. The ballistic glass assembly may also include a substantially transparent impact resistant material positioned on an opposite side of the second layer from the first layer.

14 Claims, 2 Drawing Sheets

BALLISTIC GLASS AND ASSOCIATED METHODS AND ASSEMBLIES

CROSS-REFERENCE TO RELATED APPLICATION

This application claims the benefit under 35 U.S.C. § 119(e) of U.S. Provisional Patent Application Ser. No. 63/127,858, filed Dec. 18, 2020, the disclosure of which is hereby incorporated herein in its entirety by this reference.

TECHNICAL FIELD

Embodiments of the present disclosure generally relate to glass. In particular, embodiments of the present disclosure relate to ballistic glass, to associated methods of manufacturing ballistic glass, and to assemblies for manufacturing ballistic glass.

BACKGROUND

Ballistic glasses are used to protect people in vehicles, such as ground assault vehicles, personnel transportation, railcars, aircraft, among others, as well as buildings and other structures, such as houses, buildings, bunkers, and so forth, from ballistics. Ballistics may include, for example, projectiles such as bullets, shrapnel and/or waves generated by nearby explosions, among others.

Ballistic glasses commonly comprise a laminated structure of multiple materials, and typically include multiple layers or sheets of glass, plastic, resin, and/or other hard or resilient/elastic materials, which typically must remain transparent to visible light. When a ballistic projectile hits a ballistic glass, the plate (e.g., a glass sheet) of the ballistic glass exposed to the impact must withstand the perforation by the ballistic projectile, while the opposite side plate (e.g., a resilient layer such as a polymer layer) should stop fragments of the projectile and the exposed plate from penetrating completely through the ballistic glass. For example, most ballistic glass can be characterized as having an exterior side (e.g., strike side, the side of the ballistic glass that will be exposed to ballistic projectiles when used in, for example, armored vehicles), and an interior side (the side of the ballistic glass that will be facing, for example, a cockpit or passenger cabin of a plane or ground vehicle).

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

The illustrations presented herein are not meant to be actual views of any particular ballistic glass assembly, associated tool, or components thereof, but are merely idealized representations employed to describe illustrative embodiments. The drawings are not necessarily to scale.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

Ballistic glass may be used for windows to structures, such as buildings, homes, bunkers, etc. In some embodiments, ballistic glass may be used for windows in vehicles, such as automobiles, trucks, trains, airplanes, etc. Ballistic glass may be significantly heavier than traditional glass. Increasing an effectiveness of the ballistic glass may enable the thickness and/or weight of the ballistic glass to be reduced. Reducing the thickness and/or weight of the ballistic glass may reduce costs of producing the ballistic glass. Furthermore, reducing the weight and/or thickness of the ballistic glass may make the ballistic glass easier to handle during assembly and/or installation.

Figure 1:
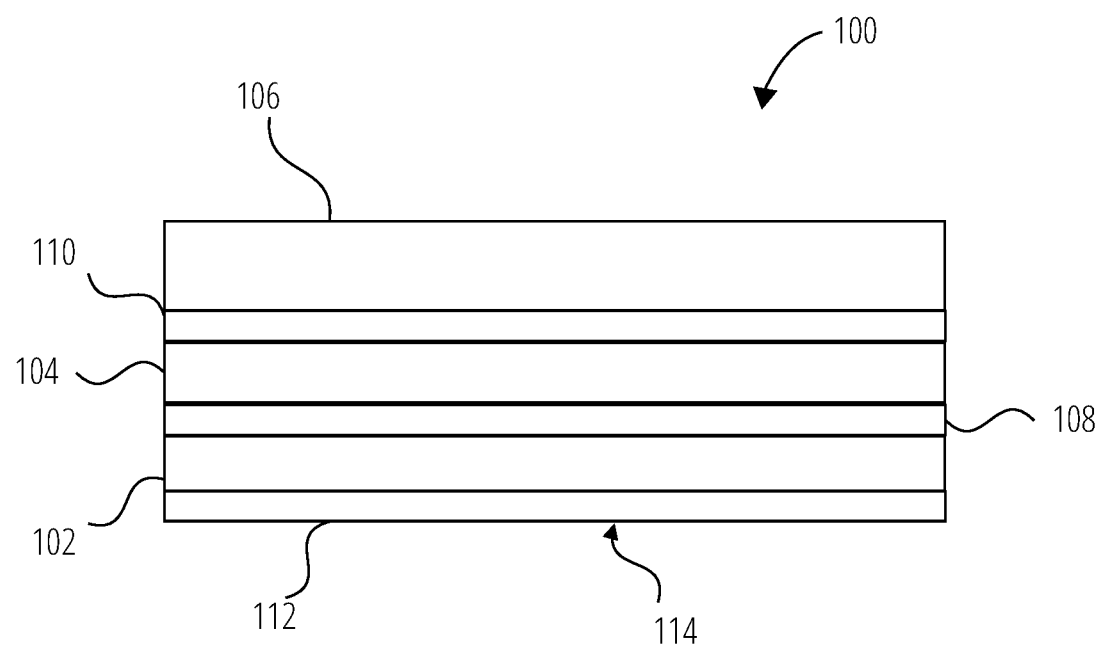
FIG. 1 illustrates a schematic view of a ballistic glass assembly in accordance with an embodiment of the present disclosure.

FIG. 1 illustrates a schematic view of a ballistic glass assembly 100 in accordance with some embodiments of the present disclosure. The ballistic glass assembly 100 may include layered polymeric materials, glass material, and/or ceramic material (e.g., aluminum oxynitride) adhered to one another by intervening adhesive layers. The ballistic glass assembly 100 may include a first glass layer 102, a second glass layer 104, an impact resistant layer 106, and at least one polymer sheet layer 112. Combination of the layers in the ballistic glass assembly 100 may be configured to absorb energy after initial impact of a projectile without shattering or allowing particles of the projectile to pass through the ballistic glass assembly 100.

The ballistic glass assembly 100 may include one or more polymer sheet layers 112. In some embodiments, each polymer sheet layer 112 may comprise one or more materials selected from among polyethylene, polyester, polycarbonate, polytetrafluoroethylene (PTFE), perfluoroalkoxy polymer (PFA), fluorinated ethylene propylene (FEP), ethylene tetrafluoroethylene (ETFE), etc. In some embodiments, the polymer sheet layers 112 may include one or more layers of a polyethylene terephthalate PET film. PET is a thermoplastic polyester that may be amorphous, crystalline, or a mixture of both depending on how the PET is produced. For example, the PET film may be a material such as ASWF Safety & Security Window Film sold by the American Standard Window Film company of Las Vegas, Nevada.

In some embodiments, the polymer sheet layers 112 may be coated with an adhesive on one or both major surfaces thereof during formation of the ballistic glass assembly 100. For example, the adhesive applied to one or both surfaces of each polymer sheet layer 112 may be a pressure sensitive polyester adhesive material. In some embodiments, the adhesive may be an adhesive film such as polyurethane adhesive films. For example, the adhesive film may be a product such as COLLANO® sold by PONTACOL® of Switzerland. In some embodiments, the polymer sheet layers 112 may be melted during the forming process adhering the adjoining layers without an additional applied adhesive.

At least one polymer sheet layer 112 may be arranged on an exterior face 114 (e.g., strike face) of the ballistic glass assembly 100, such that a projectile fired through the exterior face 114 of the ballistic glass assembly 100 may first strike the polymer sheet layer 112. The polymer sheet layer 112 may allow greater than about 80% of visible light to be transmitted through the polymer sheet layer 112, such as greater than about 85% of visible light, greater than about 89% of visible light or greater than about 90% of visible light. Each layer of the polymer sheet layer 112 may have a tensile strength of between about 30,000 pounds per square inch (psi) (206.843 megapascals (MPa)) and about 35,000 psi (241.317 MPa), such as between about 31,000 psi (213.737 MPa) and about 33,000 psi (227.527 MPa), or about 32,000 psi (220.632 MPa). Each layer of the polymer sheet layer 112 may have a break strength between about 110 pounds per linear inch (pli) (19.264 kilo-Newtons/meter (kN/m)) and about 650 pli (113.832 kN/m), such as between about 300 pli (52.538 kN/m) and about 585 pli (102.449 kN/m), or about 440 pli (77.056 kN/m). The polymer sheet layer 112 may have a puncture strength of greater than about 65 pounds (lb) (289.134 Newtons (N)), such as between about 65 lb (289.1343 N) and about 335 lb (1,490.15 N), between about 215 lb (956.368 N) and about 300 lb (1,334.47 N) or about 275 lb (1,223.26 N).

Each layer of the polymer sheet layer 112 may have a thickness between about 0.010 in (0.254 mm) and about 0.024 in (0.610 mm), such as about 0.016 in (0.4064 mm). For example, a layer of PET film may have a thickness between about 0.010 in (0.254 mm) and about 0.03 in (0.762 mm), such as between about 0.016 in (0.4064 mm) and about 0.024 in (0.610 mm). The PET film may include multiple thin layers of PET material, such as multiple layers of PET material having a thickness of about 0.001 in (0.0254 mm) bonded together with an adhesive to form the PET film. In some embodiments, the polymer sheet layer 112 may be formed from multiple layers of PET film, such as from two layers of PET film to about ten layers of PET film, or from three layers of PET film to six layers of PET film.

The polymer sheet layer 112 may be applied over a first glass layer 102. The first glass layer 102 may be formed from annealed glass, such as annealed silica glass. The first glass layer 102 may have a thickness between about 0.0625 in (1.5875 mm) and about 0.750 in (19.05 mm), such as between about 0.25 in (6.35 mm) and about 0.375 in (9.525 mm).

A second glass layer 104 may be coupled to the first glass layer 102 through a first adhesive layer 108. In some embodiments, the first adhesive layer 108 may be a sheet of polymer material, such as polyethylene terephthalate (PET), etc., coated on both sides with an adhesive, as described previously herein. In other embodiments, the first adhesive layer 108 may be an adhesive film such as polyurethane adhesive films. For example, the adhesive film may be a product such as COLLANO® sold by PONTACOL®.

The second glass layer 104 may be formed from annealed glass, such as annealed silica glass. The second glass layer 104 may have a thickness between about 0.0625 in (1.5875 mm) and about 0.750 in (19.05 mm), such as between about 0.25 in (6.35 mm) and about 0.375 in (9.525 mm). The second glass layer 104 may be coupled to an impact resistant layer 106 through a second adhesive layer 110.

The second adhesive layer 110 may be applied between the second glass layer 104 and the impact resistant layer 106 as a liquid and subsequently cured to form the second adhesive layer 110. The second adhesive layer 110 is configured to adhere the second glass layer 104 to the impact resistant layer 106. For example, an adhesive film may be positioned between the layer of second glass layer 104 and the impact resistant layer 106 and cured through high temperatures and/or pressures, such as in an autoclave, to adhere the layer of second glass layer 104 to the impact resistant layer 106.

In some embodiments, the second adhesive layer 110 may be formed from a clear epoxy resin. For example, the second adhesive layer 110 may be formed from a two part urethane resin, such as POLYLAM™ sold by GLASSLAM™. In some embodiments, the second adhesive layer 110 may be formed from a two part polyester resin. The resin forming the second adhesive layer 110 may be chosen for properties, such as adhesion, clarity, color, tint, etc. In some embodiments, the resin may initially be a liquid material that is configured to cure through a chemical reaction resulting from mixing two compounds together. In some embodiments, the resin may initially be a liquid material that is configured to cure from exposure to heat and/or UV light.

The second adhesive layer 110 may have a thickness between about 0.010 in (0.254 mm) and about 0.1 in (2.54 mm), such as between about 0.02 in (0.508 mm) and about 0.09 in (2.286 mm).

In some embodiments, the second adhesive layer 110 may be substantially transparent, such that the second adhesive layer 110 may not adversely affect visibility through the ballistic glass assembly 100. In some embodiments, the second adhesive layer 110 may be configured to alter light passing through the ballistic glass assembly 100. For example, the second adhesive layer 110 may be configured to filter ultraviolet (UV) light. In some embodiments, the second adhesive layer 110 may be a tinted material configured to reduce an amount of visible light passing through the ballistic glass assembly 100.

The impact resistant layer 106 may be formed from an impact resistant material. In some embodiments, the impact resistant material may be a thermoplastic material, such as a polycarbonate material, an acrylic material (e.g., polymethyl methacrylate), acrylic glass, etc. In some embodiments, the polycarbonate material or the acrylic material may include polymers, such as polyethylene, polypropylene, polyvinyl chloride, acrylonitrile butadiene styrene, etc. In other embodiments, the impact resistant layer 106 may comprise an optically transparent ceramic material, such as aluminum oxynitride, for example.

Polycarbonate material is a thermoplastic polymer including carbonate groups in the chemical structures. Carbonate groups (—O—(C═O)—O—) are a molecular group featuring both a short O═C bond (e.g., in the range of about 1.1 Å) and one or more slightly longer C—O bonds (e.g., in the range of about 1.3 Å). The carbonate groups may increase a rigidity and/or strength of the associated material.

Polycarbonate materials may have a tensile strength of between about 8,000 psi (55.158 MPa) and about 11,000 psi (75.842 MPa), such as between about 9,000 psi (62.053 MPa) and about 10,000 psi (68.948 MPa) or about 9,500 psi (65.500 MPa). Polycarbonate materials may have a compressive strength greater than about 11,000 psi (75.842 MPa), such as greater than about 12,000 psi (82.737 MPa) or about 12,500 psi (86.184 MPa). Polycarbonate materials may have a notched Izod impact strength of between about 11 foot-pound/inch (ft-lb/in) (587.165 joule/meter (J/m)) and about 20 ft-lb/in (1067.57 J/m), such as about 18 ft-lb/in (960.816 J/m). Commercially available polycarbonate materials include, for example, TUFFAK® sold by PLASKO-LITE®.

The optional impact resistant layer 106 may comprise any other optically transparent material that exhibits one or more similar physical properties to those exhibited by polycarbonate materials.

The optional impact resistant layer 106 may have a thickness between about 0.05 in (12.7 mm) and about 0.75 in (19.05 mm), such as between about 0.375 in (9.525 mm) and about 0.750 in (19.05 mm).

The different layers of material in the ballistic glass assembly 100 may perform different functions in achieving the desired ballistic properties of the ballistic glass assembly 100. For example, the first glass layer 102 and the second glass layer 104 may have a primary role of causing the projectile to break apart and reduce momentum of moving fragments. The slowed projectile and/or fragments of the projectile may then be captured (e.g., stopped, caught, etc.) by the impact resistant layer 106 and/or the intervening adhesive layers 108, 110. Fragmented pieces of the first glass layer 102 and the second glass layer 104 may be created by the impact of the projectile. The impact resistant layer 106 and the adhesive layers 108, 110 may be configured to capture any such pieces of the first glass layer 102, the second glass layer 104 and/or the projectile that may pass through the second glass layer 104. In some cases, the polymer sheet layers 112 may be configured to maintain the structural integrity of the ballistic glass assembly 100. For example, after the ballistic glass assembly 100 has absorbed multiple projectile impacts, the polymer sheet layers 112 may substantially prevent larger pieces of the first glass layer 102, the second glass layer 104, and/or the impact resistant layer 106 from dislodging from the respective layers, such that the first glass layer 102, the second glass layer 104 and the impact resistant layer 106 remain substantially intact to absorb additional projectile impacts.

In some embodiments, additional layers may be present in the ballistic glass assembly 100. For example, the ballistic glass assembly 100 may include additional impact resistant layers 106 and/or additional polymer sheet layers 112. In some embodiments, an additional layer of glass may be included anywhere in the ballistic glass assembly 100.

A fully assembled ballistic glass assembly 100 may have a thickness between about 0.5 in (12.7 mm) and about 2.5 in (63.5 mm), such as between about 0.875 in (22.23 mm) and about 1.3 in (33.02 mm).

Figure 2:
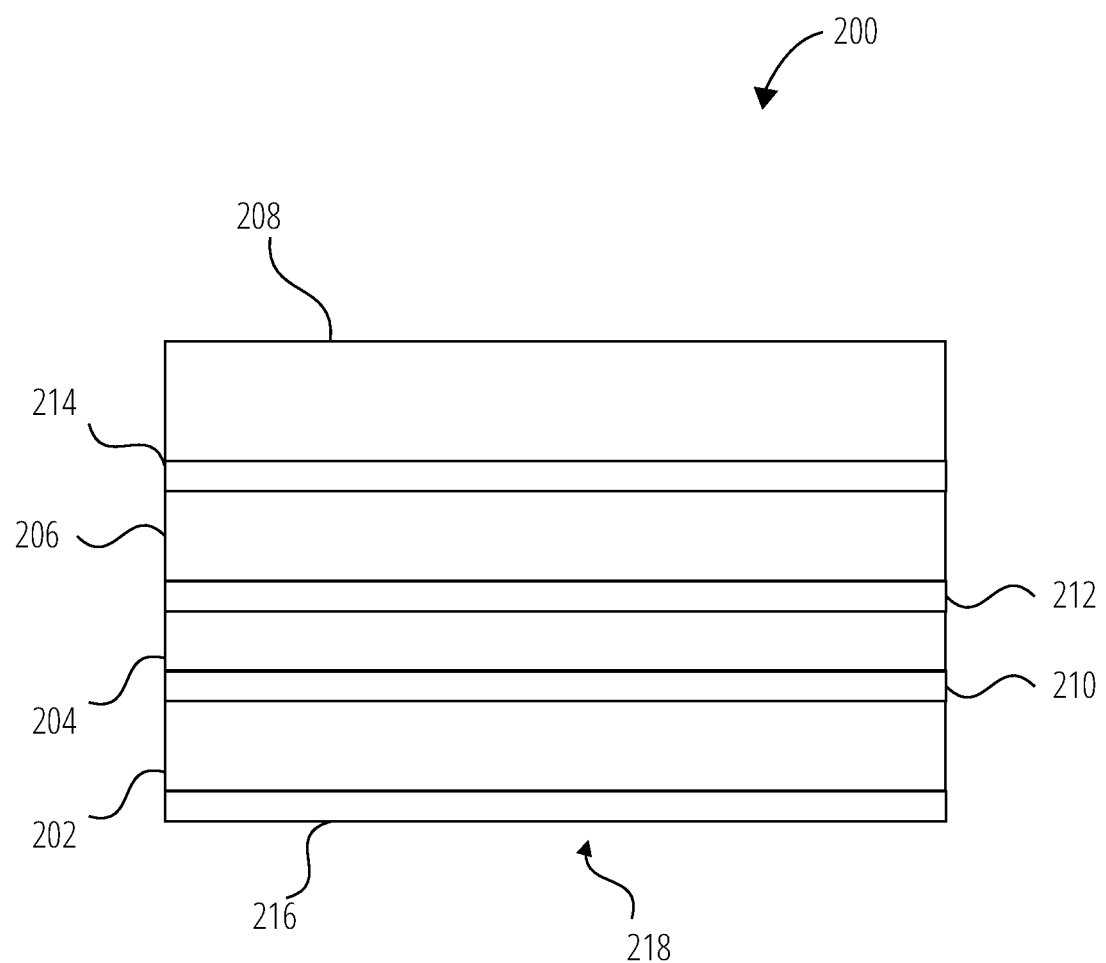
FIG. 2 illustrates a schematic view of a ballistic glass assembly in accordance with an embodiment of the present disclosure.

FIG. 2 illustrates a schematic view of a ballistic glass assembly 200 in accordance with some embodiments of the present disclosure. The ballistic glass assembly 200 may include layered polymeric materials, glass material, and/or ceramic material (e.g., aluminum oxynitride) adhered to one another by intervening adhesive layers. The ballistic glass assembly 200 may include a first glass layer 202, a second glass layer 204, a third glass layer 206, an impact resistant layer 208, and at least one polymer sheet layer 216. Combination of the layers in the ballistic glass assembly 200 may be configured to absorb energy after initial impact of a projectile without shattering or allowing particles of the projectile to pass through the ballistic glass assembly 200.

The ballistic glass assembly 200 may include one or more polymer sheet layers 216. At least one polymer sheet layer 216 may be arranged on an exterior face 218 (e.g., strike face) of the ballistic glass assembly 200, such that a projectile entering the ballistic glass assembly 200 through the exterior face 218 of the ballistic glass assembly 200 may first strike the polymer sheet layer 216. In some embodiments, the polymer sheet layers 216 may be coated with an adhesive on one or both major surfaces thereof during formation of the ballistic glass assembly 200.

Each layer of the polymer sheet layer 216 may have a thickness between about 0.004 in (0.102 mm) and about 0.03 in (0.762 mm), such as about 0.016 in (0.4064 mm) and about 0.024 in (0.610 mm). For example, a layer of PET film may have a thickness between about 0.004 in (0.102 mm) and about 0.03 in (0.762 mm), such as about 0.016 in (0.4064 mm) and about 0.024 in (0.610 mm). The PET film may include multiple thin layers of PET material, such as multiple layers of PET material having a thickness of about 0.001 in (0.0254 mm) bonded together with an adhesive to form the PET film. In some embodiments, the polymer sheet layer 112 may be formed from multiple layers of PET film, such as from two layers of PET film to about ten layers of PET film, or from three layers of PET film to six layers of PET film.

The polymer sheet layer 216 may be applied over a first glass layer 202. The first glass layer 202 may be formed from annealed glass, such as annealed silica glass. The first glass layer 202 may have a thickness between about 0.0625 in (1.5875 mm) and about 0.750 in (19.05 mm), such as between about 0.25 in (6.35 mm) and about 0.375 in (9.525 mm).

A second glass layer 204 may be coupled to the first glass layer 202 through a first adhesive layer 210. In some embodiments, the first adhesive layer 210 may be a sheet of polymer material, such as polyethylene terephthalate (PET), etc., coated on both sides with an adhesive, as described previously herein. In other embodiments, the first adhesive layer 210 may be an adhesive film such as polyurethane adhesive films. For example, the adhesive film may be a product such as COLLANO® sold by PONTACOL®.

The second glass layer 204 may be formed from annealed glass, such as annealed silica glass. The second glass layer 204 may have a thickness between about 0.0625 in (1.5875 mm) and about 0.750 in (19.05 mm), such as between about 0.25 in (6.35 mm) and about 0.375 in (9.525 mm). The second glass layer 204 may be coupled to a third glass layer 206 through a second adhesive layer 212.

In some embodiments, the second adhesive layer 212 may be substantially the same material as the first adhesive layer 210. In other embodiments, the second adhesive layer 212 may be a different material than the first adhesive layer 210.

The third glass layer 206 may be formed from annealed glass, such as annealed silica glass. The third glass layer 206 may have a thickness between about 0.0625 in (1.5875 mm) and about 0.500 in (12.70 mm), such as between about 0.25 in (6.35 mm) and about 0.375 in (9.525 mm). The third glass layer 206 may be coupled to an impact resistant layer 208 through a third adhesive layer 214.

The third adhesive layer 214 may be applied between the third glass layer 206 and the impact resistant layer 208 as a liquid and subsequently cured to form the third adhesive layer 214. The third adhesive layer 214 is configured to adhere the third glass layer 206 to the impact resistant layer 208.

In some embodiments, the third adhesive layer 214 may be formed from a clear epoxy resin. For example, the third adhesive layer 214 may be formed from a two part urethane resin, such as POLYLAM™ sold by GLASSLAM™. In some embodiments, the third adhesive layer 214 may be formed from a two part polyester resin. The resin forming the second adhesive layer 110 may be chosen for properties, such as adhesion, clarity, color, tint, etc. In some embodiments, the resin may initially be a liquid material that is configured to cure through a chemical reaction resulting from mixing two compounds together. In some embodiments, the resin may initially be a liquid material that is configured to cure from exposure to heat and/or UV light.

The third adhesive layer 214 may have a thickness between about 0.010 in (0.254 mm) and about 0.1 in (2.54 mm), such as between about 0.02 in (0.508 mm) and about 0.09 in (2.286 mm).

In some embodiments, the third adhesive layer 214 may be substantially transparent, such that the third adhesive layer 214 may not adversely affect visibility through the ballistic glass assembly 200. In some embodiments, the third adhesive layer 214 may be configured to alter light passing through the ballistic glass assembly 200 For example, the third adhesive layer 214 may be configured to filter ultraviolet (UV) light. In some embodiments, the third adhesive layer 214 may be a tinted material configured to reduce an amount of visible light passing through the ballistic glass assembly 200.

The impact resistant layer 208 may be formed from an impact resistant material. In some embodiments, the impact resistant material may be a thermoplastic material, such as a polycarbonate material, an acrylic material (e.g., polymethyl methacrylate), acrylic glass, etc. In some embodiments, the polycarbonate material or the acrylic material may include polymers, such as polyethylene, polypropylene, polyvinyl chloride, acrylonitrile butadiene styrene, etc. In other embodiments, the impact resistant layer 208 may comprise an optically transparent ceramic material, such as aluminum oxynitride, for example.

The impact resistant layer 208 may comprise any other optically transparent material that exhibits one or more similar physical properties to those exhibited by polycarbonate materials.

The impact resistant layer 106 may have a thickness between about 0.0625 in (1.5875 mm) and about 0.75 in (19.05 mm), such as between about 0.375 in (9.525 mm) and about 0.500 in (12.70 mm).

In some embodiments, additional layers may be present in the ballistic glass assembly 100. For example, the ballistic glass assembly 100 may include additional impact resistant layers 106 and/or additional polymer sheet layers 112. In some embodiments, additional layers of glass may be included anywhere in the ballistic glass assembly 100.

A fully assembled ballistic glass assembly 100 may have a thickness between about 0.5 in (12.7 mm) and about 2 in (50.8 mm), such as between about 1.5 in (38.1 mm) and about 1.7 in (43.18 mm).

Embodiments of the present disclosure may improve the performance on ballistic glass assemblies. For example, embodiments of the present disclosure may enable ballistic glass that is lighter weight and/or thinner than traditional ballistic glass. Lighter weight and/or thinner ballistic glass may reduce costs required to produce the ballistic glass. Reducing the cost of production may reduce the cost of adding ballistic protection to a building or other structure, which may enable better ballistic protection to be provided.

The following examples serve to explain embodiments of the disclosure in more detail. These examples are not to be construed as being exhaustive or exclusive as to the scope of the disclosure.

EXAMPLES

Example 1

A ballistic glass assembly may include a PET film layer on an outermost or strike face. The PET film may be applied over a first annealed silica glass layer having a thickness of 0.25 in (6.35 mm). The first annealed silica glass layer may be coupled to a second annealed silica glass layer with an adhesive film. The adhesive film may have a thickness of about 0.002 in (0.05 mm). The second annealed silica glass layer may have a thickness of 0.25 in (6.35 mm). The second annealed silica glass layer may be coupled to an impact resistant layer through a second adhesive layer. The second adhesive layer may be formed from a liquid laminate comprising a clear epoxy resin. The second adhesive layer may have a thickness between about 0.02 in (0.508 mm) and about 0.09 in (2.286 mm). The impact resistant layer may be a polycarbonate material. The polycarbonate material may have a thickness of 0.375 in (9.525 mm). The total thickness of the ballistic glass assembly may be between about 0.913 in (23.19 mm) and about 0.991 in (25.171 mm).

Example 2

A ballistic glass assembly may include a PET film layer on an outermost or strike face. The PET film may be applied over a first annealed silica glass layer having a thickness of 0.375 in (9.525 mm). The first annealed silica glass layer may be coupled to a second annealed silica glass layer with an adhesive film. The adhesive film may have a thickness of about 0.002 in (0.05 mm). The second annealed silica glass layer may have a thickness of 0.375 in (9.525 mm). The second annealed silica glass layer may be coupled to an impact resistant layer through a second adhesive layer. The second adhesive layer may be formed from a liquid laminate comprising a clear epoxy resin. The second adhesive layer may have a thickness between about 0.02 in (0.508 mm) and about 0.09 in (2.286 mm). The impact resistant layer may be a polycarbonate material. The polycarbonate material may have a thickness of 0.5 in (12.7 mm). The total thickness of the ballistic glass assembly may be between about 1.288 in (32.715 mm) and about 1.366 in (34.696 mm).

Example 3

A ballistic glass assembly may include a PET film layer on an outermost or strike face. The PET film may be applied over a first annealed silica glass layer having a thickness of 0.375 in (9.525 mm). The first annealed silica glass layer may be coupled to a second annealed silica glass layer with an adhesive film. The adhesive film may have a thickness of about 0.002 in (0.05 mm). The second annealed silica glass layer may have a thickness of 0.25 in (6.35 mm). The second annealed silica glass layer may be coupled to a third annealed silica glass layer with second adhesive film substantially the same as the first adhesive film. The third annealed silica glass layer may have a thickness of 0.375 in (9.525 mm). The third annealed silica glass layer may be coupled to an impact resistant layer through a third adhesive layer. The second adhesive layer may be formed from a liquid laminate comprising a clear epoxy resin. The second adhesive layer may have a thickness between about 0.02 in (0.508 mm) and about 0.09 in (2.286 mm). The impact resistant layer may be a polycarbonate material. The polycarbonate material may have a thickness of 0.5 in (12.7 mm). The total thickness of the ballistic glass assembly may be between about 1.538 in (39.065 mm) and about 1.616 in (41.046 mm).

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A ballistic glass assembly comprising:
   a first layer comprising a poly ethylene terephthalate (PET) film located on an exterior face of the ballistic glass assembly, the first layer having a thickness between 0.01 in (0.254 mm) and 0.03 in (0.762 mm);
   a second layer comprising annealed silica glass connected to the first layer by a first adhesive layer, the second layer having a thickness between 0.0625 in (1.5875 mm) and 0.750 in (19.05 mm); and
   a third layer comprising a material selected from the group consisting of a polycarbonate material, an acrylic material, and a ceramic material, the third layer connected to the second layer by a second adhesive layer, the third layer positioned on an opposite side of the second layer from the first layer and located on an interior face of the ballistic glass assembly, the third layer having a thickness between 0.05 in (12.7 mm) and 0.75 in (19.05 mm);
   wherein a thickness of the ballistic glass assembly is between 0.875 in (22.23 mm) and 1.3 in (33.02 mm).

2. The ballistic glass assembly of claim 1, wherein the second layer comprises at least two layers of glass.

3. The ballistic glass assembly of claim 1, wherein the ceramic material is aluminum oxynitride.

4. The ballistic glass assembly of claim 1, wherein the third layer has a tensile strength of between about 8,000 psi and about 11,000 psi.

5. The ballistic glass assembly of claim 1, wherein the third layer has a compressive strength greater than about 11,000 psi.

6. The ballistic glass assembly of claim 1, wherein the third layer has a notched Izod impact strength of between about 11 foot-pound/inch (ft-lb/in) and about 20 ft-lb/in.

7. The ballistic glass assembly of claim 1, wherein the first adhesive layer comprises a clear epoxy resin.

8. The ballistic glass assembly of claim 1, wherein the second adhesive layer comprises a tinted material.

9. The ballistic glass assembly of claim 1, wherein greater than about 90% of visible light passes through the first layer.

10. The ballistic glass assembly of claim 1, wherein the first layer has a puncture strength of greater than about 65 lbs.

11. The ballistic glass assembly of claim 10, wherein the first layer has a puncture strength between about 65 lbs. and about 335 lbs.

12. The ballistic glass assembly of claim 1, wherein the third layer further comprises at least one of polyethylene, polypropylene, polyvinyl chloride, and acrylonitrile butadiene styrene.

13. The ballistic glass assembly of claim 1, wherein the first layer has a break strength between about 110 pounds per linear inch and about 650 pounds per linear inch.

14. The ballistic glass assembly of claim 1, wherein the first layer comprises between two layers of PET film to ten layers of PET film.

* * * * *

UNITED STATES PATENT AND TRADEMARK OFFICE
CERTIFICATE OF CORRECTION

| | | |
|---|---|---|
| PATENT NO. | : 12,104,884 B2 | Page 1 of 1 |
| APPLICATION NO. | : 17/553377 | |
| DATED | : October 1, 2024 | |
| INVENTOR(S) | : Dean Casutt and Bryant Casutt | |

It is certified that error appears in the above-identified patent and that said Letters Patent is hereby corrected as shown below:

On the Title Page

In Item (73) Assignee:     change "Arimtek LLC, Orem, UT (US)" to
--Armitek LLC, Orem, UT (US)--

Signed and Sealed this
Nineteenth Day of November, 2024

*Katherine Kelly Vidal*

Katherine Kelly Vidal
*Director of the United States Patent and Trademark Office*